June 1, 1926.
C. ANHOF
SPACE GUIDE
Filed July 29, 1925
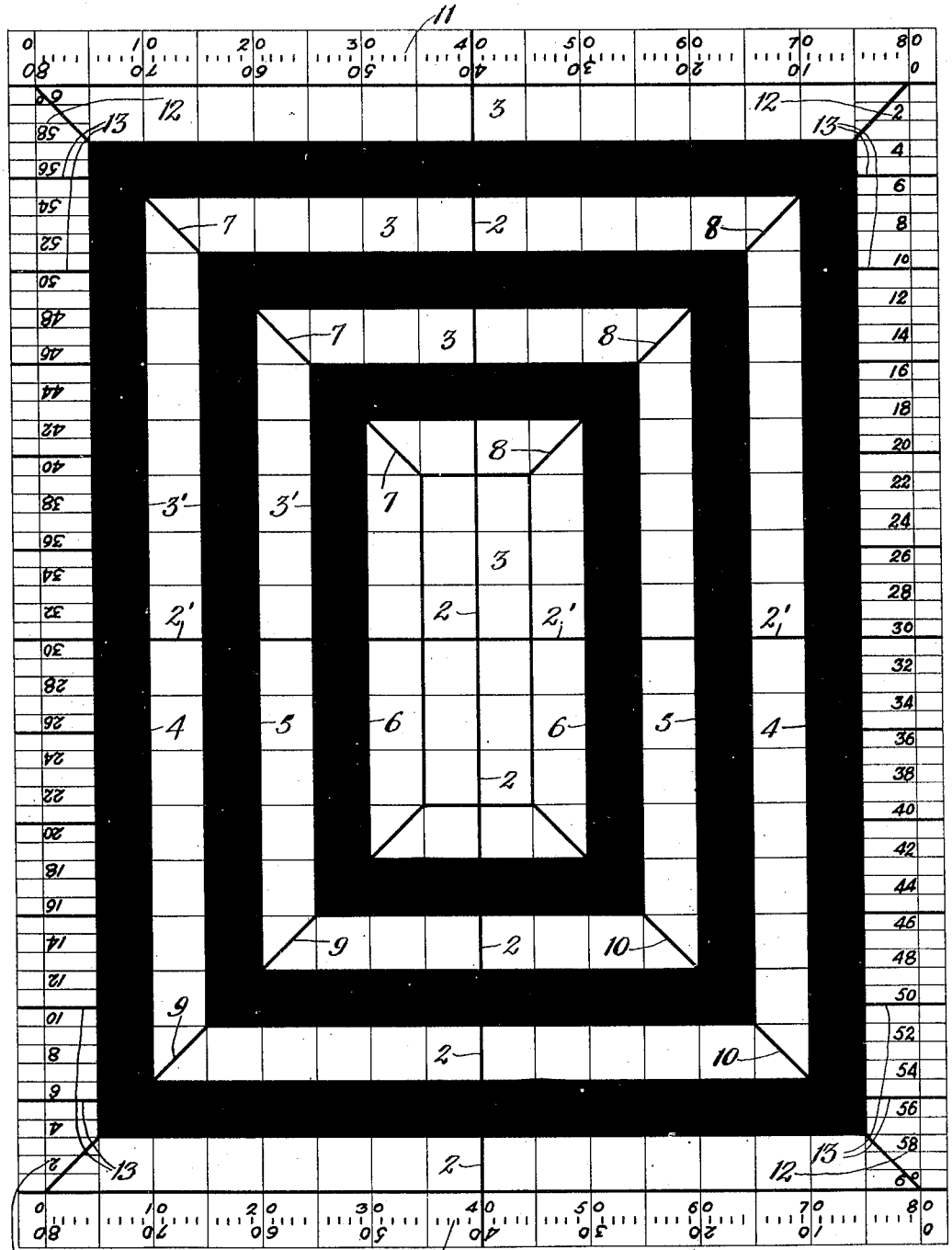
INVENTOR
Claras Anhof
BY C. Campbell
ATTORNEY Patented June 1, 1926.

1,587,133

UNITED STATES PATENT OFFICE.

CLARAS ANHOF, OF NEW YORK, N. Y.

SPACE GUIDE.

Application filed July 29, 1925. Serial No. 46,732.

This invention relates to a device to guide typists and others to determine margins of uniform width and the proper spacing of words.

Although a typewriter has marginal stops which limit the motion of a typewriter carriage in either direction, thus producing two vertical margins (left and right hand) on a typewritten sheet, it has no mechanism to indicate the proper distance or space for the margins at the top and bottom of a typewritten sheet to correspond with the margins on the left and right hand sides of the sheet. Furthermore, typists as a rule seldom use the marginal stop for the right hand margin because they find that it retards their speed and is troublesome to frequently change or set the mechanism to secure a uniform right hand margin for varying lengths of copy.

One of the objects of this invention is to provide a visible margin guide to the typist and others that will indicate the correct amount of space for the margins at the top and bottom of a sheet as well as the vertical left and right hand margins for varying lengths of copy.

Still another object of this invention is to enable the typist to dispense with setting the mechanism on the typewriting machine for the right hand vertical margins.

A further object of the invention is to provide a margin guide for the instruction of typists in the art of properly spacing copy on a sheet of paper.

Still another object of the invention is to enable a typist to space in a similar and identical fashion separate sheets of paper.

A further object of the invention is to provide a guide for the proper spacing of copy or ruling of any description, either by mechanical means or by hand, on a given size sheet of paper.

Referring to the drawing:—

The view shown therein is of a device embodying the principles of my invention.

In carrying out my invention, I propose to provide a sheet of paper 1, or other flexible material, of the same size as the paper on which the original copy is to be ruled or written. Sheet 1 need not necessarily be white in color but should be of a color that will contrast with the color black (or other color) and be visible through a sheet of paper.

Sheet 1 is divided vertically and horizontally in the mid section by heavy lines 2, 2'.

The central portion of sheet 1 is divided into uniform squares 3, 3'. The alternate rows of squares 3' are filled in with black (or other color) forming three solid black rectangles 4, 5, 6. Diagonal lines 7, 8, 9, 10, connect the corners of the black rectangles 4, 5, 6.

Sheet 1, at the top and bottom, has a double or reversed measuring scale 11, corresponding to the front scale on a typewriter. On each side of sheet 1, but in opposite directions, thereby making the guide reversible, i. e., usable in either direction, are scales 12, representing or registering the number of lines, single space, that may be written on a typewriter on a sheet of paper similar in size to sheet 1. The numerals of scale 12 indicate double line spacing. A heavy line 13 indicates every fifth single line space on scale 12. Triple line spacing is indicated by the horizontal lines forming the uniform squares 3, 3'.

The operation of the device is as follows:—

Sheet 1 is placed immediately back of the letter head or paper on which the original is to be typed or written, the carbon paper and other paper for duplicate copies being placed beneath sheet 1. Sheet 1 and the markings thereon are visible through the top letter head or sheet of paper. All the papers are then inserted in the cylinder or platen of the typewriter as is customary, with the left hand edges and top edges of the papers even. The typist, in one motion, while inserting the papers in the cylinder, centers the papers in the machine by matching the heavy vertical line 2 running through the center number in scale 11, with the corresponding number on front scale (or cylinder scale, as the case may be) on the typewriter, and, should the papers be inserted unevenly, straightens them parallel with the cylinder scale, and adjusts the papers so that any one of the horizontal lines on sheet 1 (visible through the top letter head or sheet of paper) is directly above the writing line and parallel with the cylinder scale.

The typist then sets the marginal stop on the typewriter as desired for the left hand margin, guided by the particular black rectangle that is proper for the amount of copy to be typed. The right hand margin is indicated by the opposite side of the black rectangle chosen on sheet 1.

The typist may utilize either the outer or the inner edge of the black rectangle, whichever indicates the most appropriate margins for the amount of copy to be written.

The margin at the top and bottom of the letter head or sheet of paper will likewise be governed by the black rectangle chosen, either outer or inner edge as the case may be. If the writing is started at the outer or top edge of a black rectangle, the writing may be continued to finish at the outer or lower edge of the black rectangle chosen.

If the typist desires to indent paragraphs, such paragraphs may be started at the outer or inner edge of any black rectangle for the left hand margin and the other side of such black rectangle, outer or inner edge as the case may be, will indicate to the typist the correct right hand margin for the indented paragraph. If the copy to be indented is more than a few lines, the typist, for greater convenience, may set the marginal stop on the typewriter for the left hand margin at the chosen edge of the black rectangle, and change to the original position when the indented paragraph is completed.

Should typist desire to center or space any word or group of words, the typist turns down sheet 1 over the letter head with the left hand edges even and holds it in position with scale 11 just above the writing line by slipping it back of the paper clamps on the machine. The center of the paper is indicated by line 2, running through the center numeral of scale 11 on sheet 1. According to the number of letters and spaces in the word or group of words, scale 11 indicates the correct spacing and position for the word or group of words to be typed at the desired point.

The space between each vertical line on sheet 1 indicates five spaces or releases of the space-bar on the typewriter, as shown on the front or cylinder scale. Therefore, the typist will know the exact number of letters that may be written from any given point to finish the line to the right hand margin indicated by the rectangle chosen. The typist may readily gauge the exact number of letters that may be written in any black rectangle, or from any point on the writing line to any other point desired.

The space between each horizontal line on sheet 1 indicates triple line spacing or three single line space releases on the typewriter. Therefore, when the typist places any horizontal line even with the writing line on the machine, scale 12 at the side of sheet 1 shows the exact number of single space lines that may be written on a typewriter on a sheet of paper similar in size to sheet 1. Also the typist can gauge the number of lines—either single, double or triple space—that may be written on the paper in any chosen rectangle from either outer or inner edge.

Modifications of the device might be made and yet fall within the principles of my invention. For instance, the squares 3' which are filled in to form the black rectangles 4, 5, 6, might have crosses or other lines therein to indicate rectangles, or black rectangles 4, 5, 6, might be changed to another position, viz., to correspond with the numerals and spaces 10—15, 20—25 and 30—35 on scale 11, instead of to spaces and numerals 5—10, 15—20 and 25—30 as shown in the drawing. Also, empty squares 3 might have markings therein to differentiate each row from the other, and scales 11 and scales 12 might vary in spacing and length in accordance with the different scales and styles of type, (elite, pica, etc.), of typewriters, or might be omitted altogether. Also, squares 3, 3' and black rectangles 4, 5, 6, might be decreased in width and size and/or be increased in number, varying in accordance with the size of sheet 1 and the size of the paper with which it is to be used.

What I claim is:—

1. A space guide comprising a sheet, squares on said sheet, alternate rows of said squares filled in with a contrasting color to the color of the sheet to form a series of concentric and coaxial rectangles.

2. A space guide comprising a sheet, scales at the top and bottom of said sheet, said scales corresponding to the front scale on a typewriter, squares on said sheet between said scales, alternate rows of said squares filled in with a contrasting color to the color of the sheet to form a series of concentric and coaxial rectangles.

3. A space guide comprising a sheet, scales at the top and bottom of said sheet, said scales corresponding to the front scale on a typewriter, numerals on said scales, the numerals on the bottom scale being upside down and in inverse order to the numerals on the top scale to permit of a reversing of the sheet, squares on said sheet between said scales, alternate rows of said squares filled in with a contrasting color to the color of the sheet to form a series of concentric and coaxial rectangles.

4. A space guide comprising a sheet, scales at the top and bottom of said sheet, said scales corresponding to the front scale on a typewriter, scales on each side of said sheet corresponding to the rotational spacing of the platen on a typewriter, squares on said sheet between said scales, alternate rows of said squares filled in with a contrasting color to the color of the sheet to form a series of concentric and coaxial rectangles.

5. A space guide comprising a sheet, scales running across the top and bottom of said sheet, scales running from top to bottom on each side of said sheet, numerals on each scale, the numerals on the bottom scale and on the left hand side scale being upside down and in inverse order to the numerals on the top scale and right hand side scale, line bisecting said sheet vertically and horizontally, squares on said sheet between said scales, alternate rows of said squares filled in with a contrasting color to the color of the sheet to form a series of concentric and coaxial rectangles.

Signed at New York, in the county of New York, and State of New York this 28th day of July, A. D. 1925.

CLARAS ANHOF.